(12) United States Patent
Xu et al.

(10) Patent No.: US 12,532,354 B2
(45) Date of Patent: Jan. 20, 2026

(54) USER EQUIPMENT INITIATED CHANNEL OCCUPANCY TIME IN FRAME BASED EQUIPMENT MODE

(71) Applicant: QUALCOMM Incorporated, San Diego, CA (US)

(72) Inventors: Changlong Xu, Beijing (CN); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 516 days.

(21) Appl. No.: 17/999,579

(22) PCT Filed: Jul. 21, 2020

(86) PCT No.: PCT/CN2020/103214
§ 371 (c)(1),
(2) Date: Nov. 22, 2022

(87) PCT Pub. No.: WO2022/016358
PCT Pub. Date: Jan. 27, 2022

(65) Prior Publication Data
US 2023/0199833 A1    Jun. 22, 2023

(51) Int. Cl.
*H04W 74/08* (2024.01)
*H04L 12/413* (2006.01)
(Continued)

(52) U.S. Cl.
CPC ....... *H04W 74/0808* (2013.01); *H04L 12/413* (2013.01); *H04W 72/0446* (2013.01)

(58) Field of Classification Search
CPC ............. H04L 12/413; H04L 49/254; H04L 2012/5679; H04W 72/0446; H04W 72/12; H04W 72/50; H04W 74/0808
See application file for complete search history.

(56) References Cited

U.S. PATENT DOCUMENTS 10,764,913 B2 *  9/2020  Yerramalli ............ H04W 76/27
10,912,118 B2 *  2/2021  Tiirola .................... H04W 4/10
(Continued)

FOREIGN PATENT DOCUMENTS

CN    106304092 A    1/2017
CN    110383933 A    10/2019
(Continued)

OTHER PUBLICATIONS

Intel Corporation: "Views on Unlicensed Band URLLC/IIoT Operation Objective of the Rel-17 Enhanced IIOT and URLLC Support WI," 3GPP TSG-RAN Meeting #88-e, Online, Jun. 29-Jul. 3, 2020, Jun. 22, 2020 (Jun. 22, 2020), RP-200903, 4 pages, the whole document.

(Continued)

*Primary Examiner* — Alpus Hsu
(74) *Attorney, Agent, or Firm* — Harrity & Harrity, LLP

(57) ABSTRACT

Various aspects of the present disclosure generally relate to wireless communication. In some aspects, a user equipment (UE) may determine a contention slot in which to initiate a listen-before-talk (LBT) procedure based at least in part on a start time associated with a fixed frame period configured for the UE in a frame based equipment mode. The UE may initiate the LBT procedure in the contention slot to acquire a channel occupancy time in an unlicensed channel. Numerous other aspects are provided.

30 Claims, 9 Drawing Sheets

(51) Int. Cl.
  *H04W 72/04* (2023.01)
  *H04W 72/0446* (2023.01)
  *H04W 74/0808* (2024.01)

(56) References Cited

U.S. PATENT DOCUMENTS

| | | | | |
|---|---|---|---|---|
| 10,959,263 | B2* | 3/2021 | Naghshvar | H04B 7/0695 |
| 2016/0192396 | A1 | 6/2016 | Ng | |
| 2019/0335456 | A1 | 10/2019 | Yerramalli et al. | |
| 2020/0037354 | A1 | 1/2020 | Li et al. | |
| 2020/0053798 | A1 | 2/2020 | Tsai et al. | |
| 2020/0244403 | A1* | 7/2020 | Talarico | H04L 5/0044 |
| 2020/0322988 | A1* | 10/2020 | Fisher-Jeffes | H04W 74/0808 |
| 2021/0084683 | A1* | 3/2021 | Li | H04W 74/0808 |
| 2021/0176783 | A1* | 6/2021 | Xue | H04W 24/10 |
| 2022/0131725 | A1* | 4/2022 | Li | H04L 5/0048 |
| 2023/0064684 | A1* | 3/2023 | Xu | H04L 5/0048 |

FOREIGN PATENT DOCUMENTS

| | | |
|---|---|---|
| WO | 2016071741 A1 | 5/2016 |
| WO | 2020032727 A1 | 2/2020 |
| WO | 2020091569 A1 | 5/2020 |
| WO | 2020125121 A1 | 6/2020 |

OTHER PUBLICATIONS

International Search Report and Written Opinion—PCT/CN2020/103214—ISA/EPO—Apr. 20, 2021.
Vivo: "Discussion on the Channel Access Procedures", 3GPP TSG RAN WG1#99, R1-1912012, Reno, USA, Nov. 18-22, 2019, Nov. 22, 2019 (Nov. 22, 2019), 10 Pages, Section 1-3, sections 2.4-2.6, 3.
Convida Wireless: "On Channel Access with FBE for NR Unlicensed", 3GPP TSG-RAN WG1 #99, R1-1913130, Reno, USA, Nov. 18-22, 2019, Nov. 9, 2019, pp. 1-6.
Nokia, et al., "Feature Lead's Summary on Channel Access Procedures", 3GPP TSG RAN WG1 Meeting #99, R1-1912258, Reno, US, Nov. 18-22, 2019, Nov. 20, 2019, 25 Pages, the whole document.
Zte, et al., "Remaining Issues on the Channel Access Procedure for NR-U", 3GPP TSG RAN WG1 #100b, R1-2001705, e-Meeting, Apr. 20-30, 2020, Apr. 11, 2020, pp. 1-15, The whole document.
Supplementary European Search Report—EP20945992—Search Authority—Munich—Mar. 15, 2024.

* cited by examiner

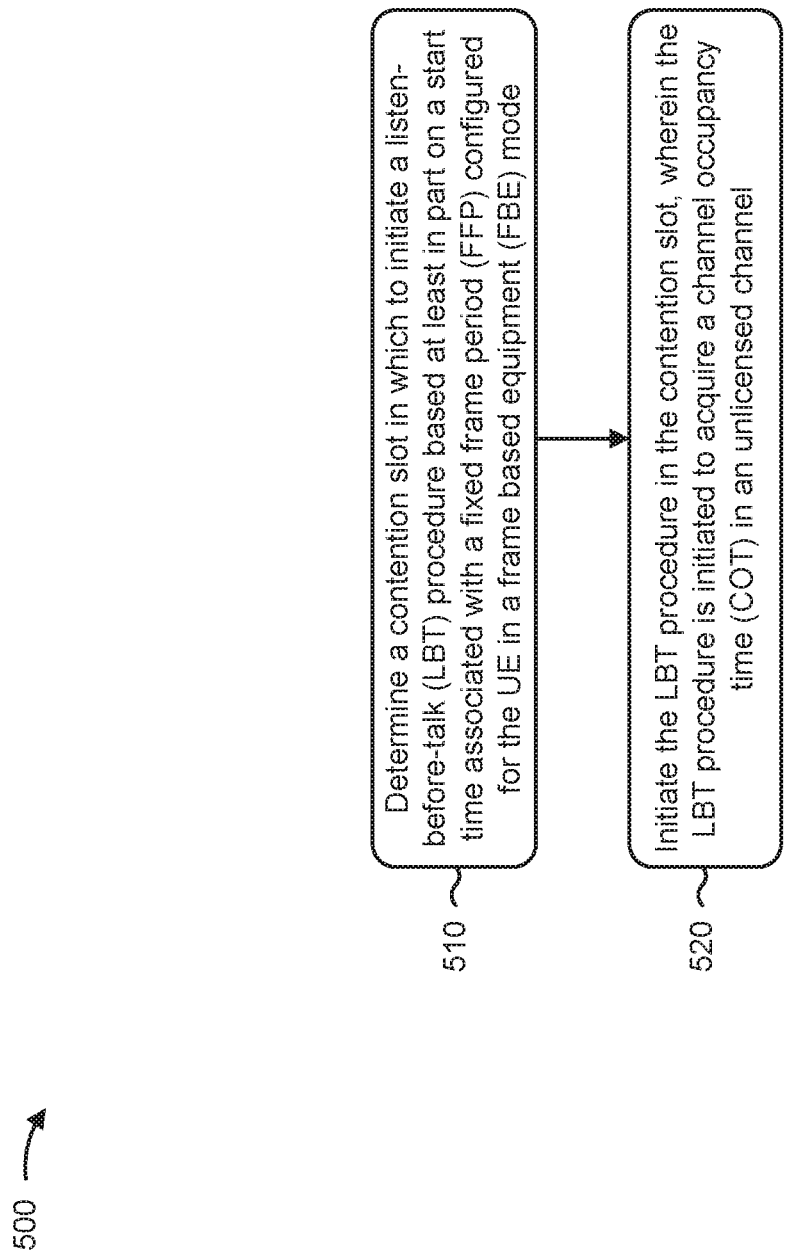

USER EQUIPMENT INITIATED CHANNEL OCCUPANCY TIME IN FRAME BASED EQUIPMENT MODE

CROSS-REFERENCE TO RELATED APPLICATION

This application is a 371 national stage of Patent Cooperation Treaty (PCT) Application No. PCT/CN2020/103214 filed on Jul. 21, 2020, entitled "USER EQUIPMENT INITIATED CHANNEL OCCUPANCY TIME IN FRAME BASED EQUIPMENT MODE," which is hereby expressly incorporated by reference herein.

FIELD OF THE DISCLOSURE

Aspects of the present disclosure generally relate to wireless communication and to techniques and apparatuses for user equipment (UE) initiated channel occupancy time (COT) in frame based equipment (FBE) mode.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: determining a contention slot in which to initiate a listen-before-talk (LBT) procedure based at least in part on a start time associated with a fixed frame period (FFP) configured for the UE in a frame based equipment (FBE) mode; and initiating the LBT procedure in the contention slot, wherein the LBT procedure is initiated to acquire a channel occupancy time (COT) in an unlicensed channel.

In some aspects, a UE for wireless communication includes: a memory; and one or more processors operatively coupled to the memory, the memory and the one or more processors configured to: determine a contention slot in which to initiate an LBT procedure based at least in part on a start time associated with an FFP configured for the UE in an FBE mode; and initiate the LBT procedure in the contention slot, wherein the LBT procedure is initiated to acquire a COT in an unlicensed channel.

In some aspects, a non-transitory computer-readable medium storing a set of instructions for wireless communication includes: one or more instructions that, when executed by one or more processors of a UE, cause the UE to: determine a contention slot in which to initiate an LBT procedure based at least in part on a start time associated with an FFP configured for the UE in an FBE mode; and initiate the LBT procedure in the contention slot, wherein the LBT procedure is initiated to acquire a COT in an unlicensed channel.

In some aspects, an apparatus for wireless communication includes: means for determining a contention slot in which to initiate an LBT procedure based at least in part on a start time associated with an FFP configured for the apparatus in an FBE mode; and means for initiating the LBT procedure in the contention slot, wherein the LBT procedure is initiated to acquire a COT in an unlicensed channel.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example process associated with a UE initiated COT in FBE mode, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technologies (RAT), aspects of the present disclosure can be applied to other RATs, such as a 3G RAT, a 4G RAT, and/or a RAT subsequent to 5G (e.g., 6G).

Figure 1:
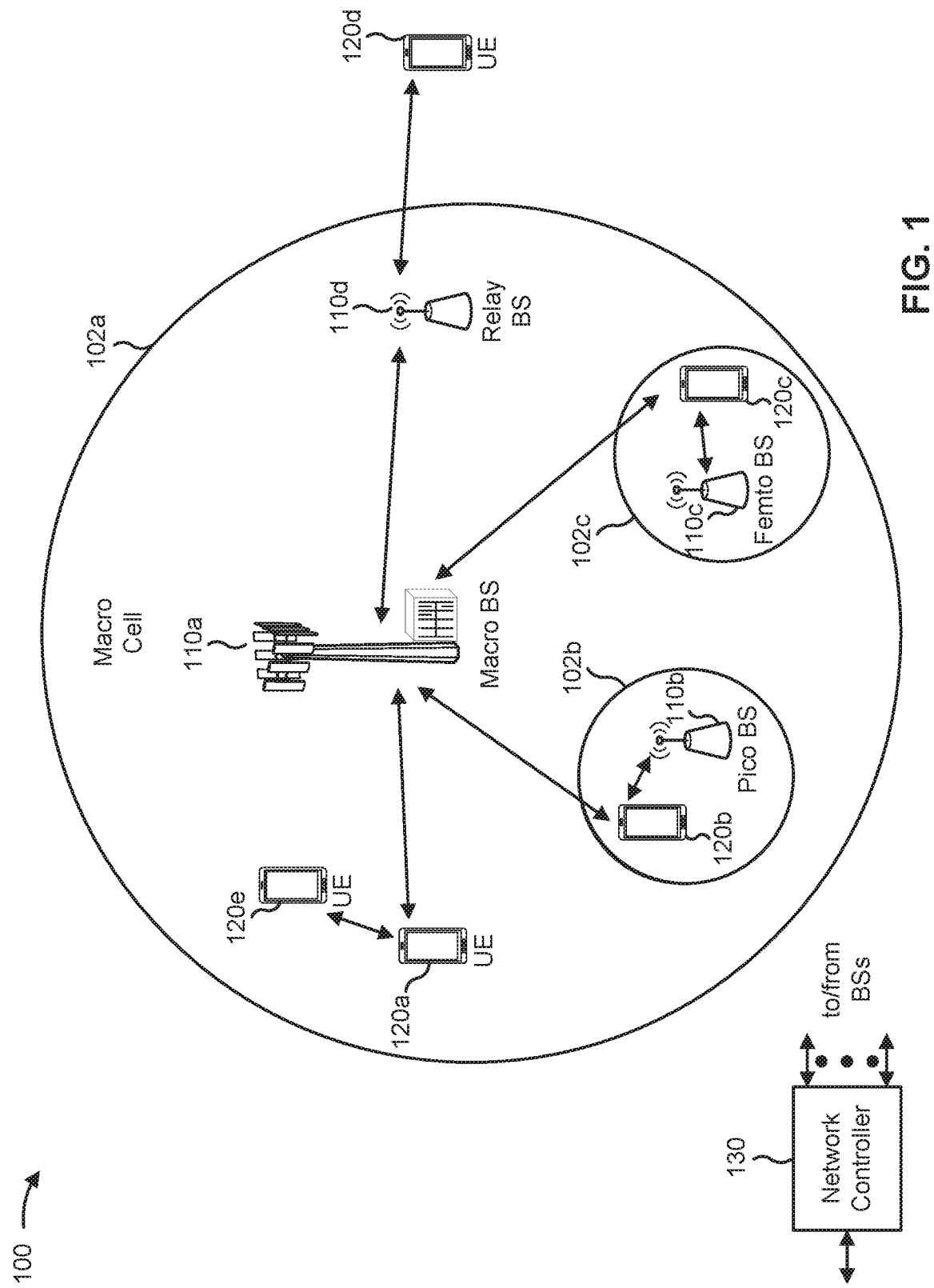
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
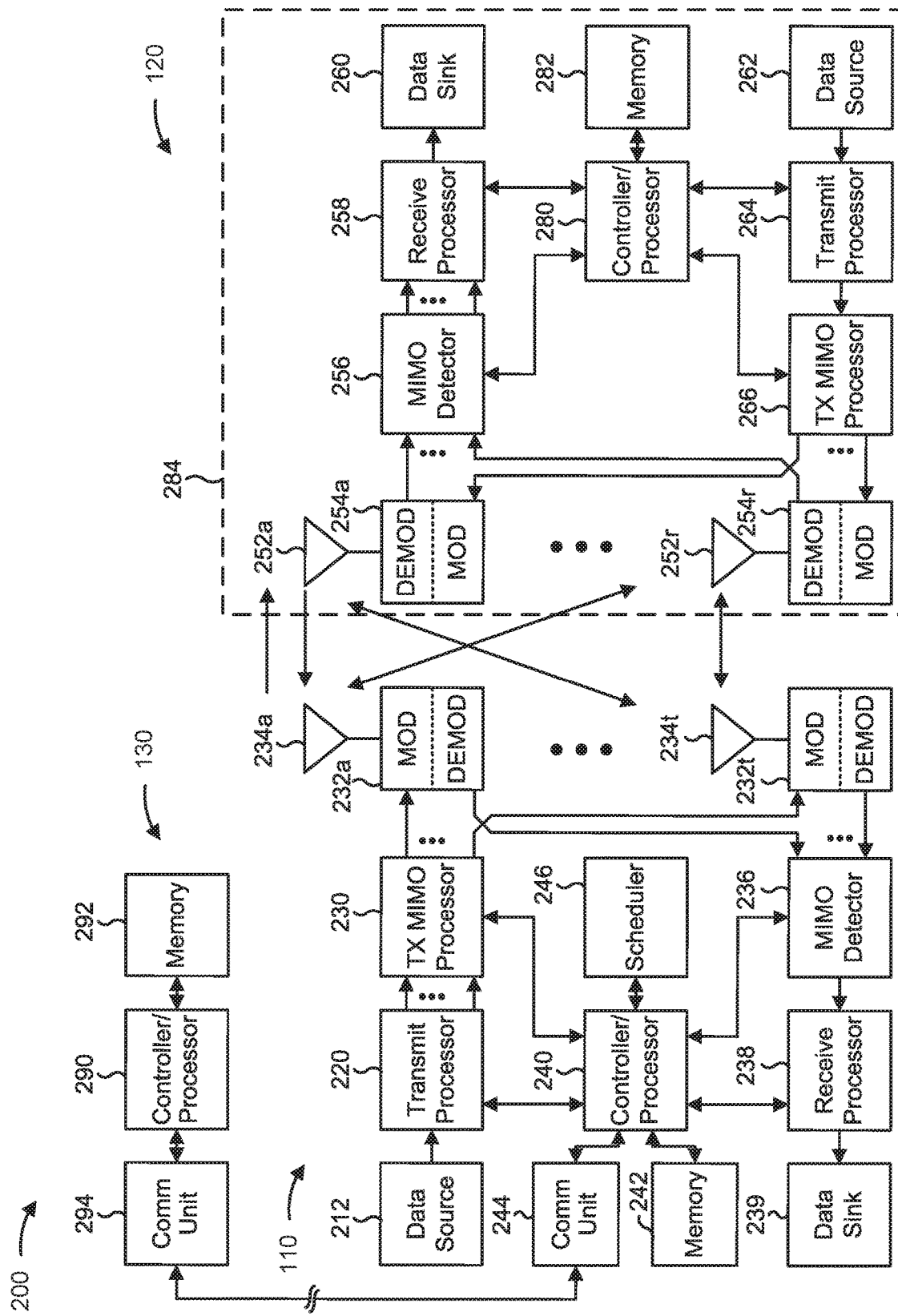
FIG. 2 is a diagram illustrating an example of a base station in communication with a user equipment (UE) in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4A-4D and/or FIG. 5.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4A-4D and/or FIG. 5.

Controller/processor 240 of base station 110, controller/processor 280 of UE 120, and/or any other component(s) of FIG. 2 may perform one or more techniques associated with a UE initiated channel occupancy time (COT) in frame based equipment (FBE) mode, as described in more detail elsewhere herein. For example, controller/processor 240 of base station 110, controller/processor 280 of UE 120, and/or any other component(s) of FIG. 2 may perform or direct operations of, for example, process 500 of FIG. 5 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 500 of FIG. 5 and/or other processes as described herein. In some aspects, executing instructions may include running the instructions, converting the instructions, compiling the instructions, interpreting the instructions, and/or the like.

In some aspects, UE 120 may include means for determining a contention slot in which to initiate a listen-before-talk (LBT) procedure based at least in part on a start time associated with a fixed frame period (FFP) configured for UE 120 in an FBE mode, means for initiating the LBT procedure in the contention slot to acquire a COT in an unlicensed channel, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3A:
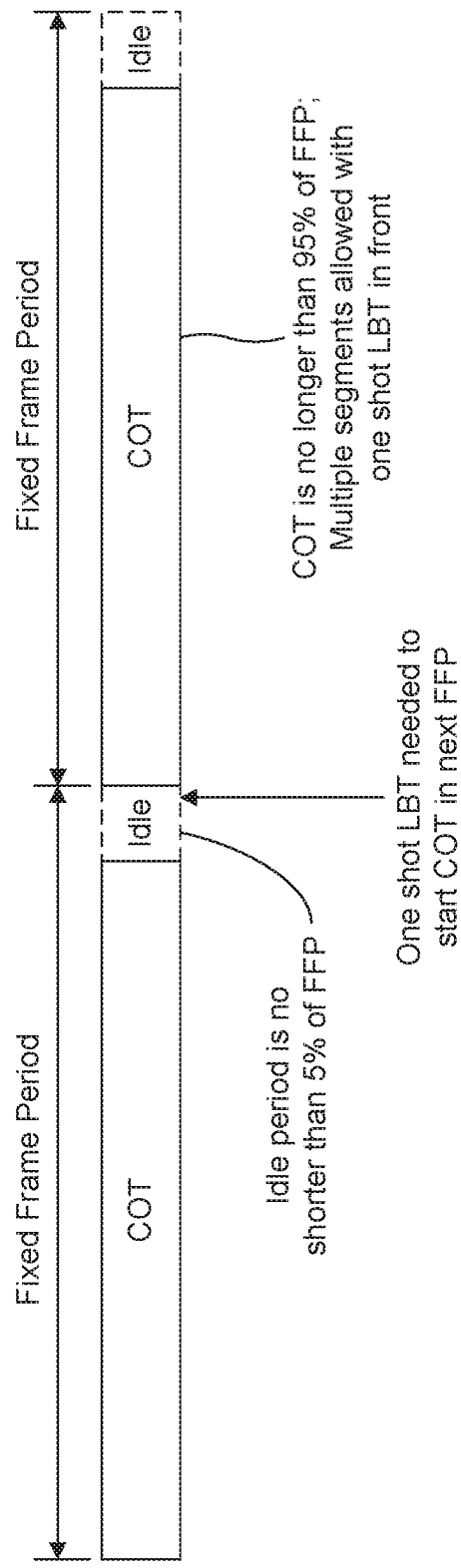
FIGS. 3A-3B are diagrams illustrating one or more examples of a fixed frame period (FFP) that includes a channel occupancy time (COT) during which one or more transmissions may be conducted in an unlicensed channel, in accordance with various aspects of the present disclosure.
Figure 3B:
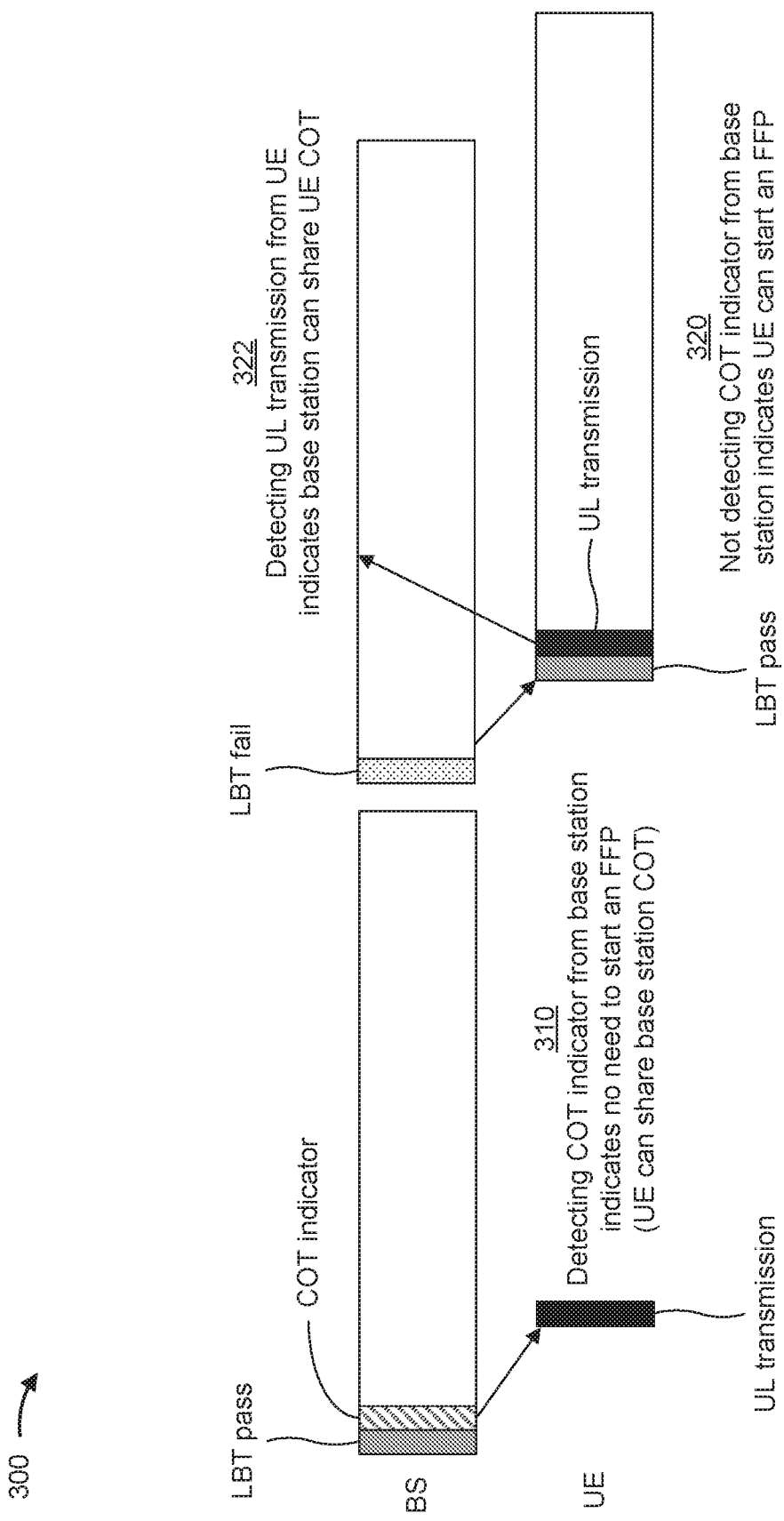

FIGS. 3A-3B are diagrams illustrating one or more examples 300 of a fixed frame period (FFP) that includes a channel occupancy time (COT) during which one or more transmissions may be conducted in an unlicensed channel, in accordance with various aspects of the present disclosure. To accommodate increasing traffic demands, there have been various efforts to improve spectral efficiency in wireless networks and thereby increase network capacity (e.g., via use of higher order modulations, advanced MIMO antenna technologies, multi-cell coordination techniques, and/or the like). Another way to potentially improve network capacity is to expand system bandwidth. However, available spectrum in lower frequency bands that have traditionally been licensed or otherwise allocated to mobile network operators has become very scarce. Accordingly, various technologies have been developed to enable a cellular radio access technology (RAT) to operate in unlicensed or other shared spectrum. For example, Licensed-Assisted Access (LAA) uses carrier aggregation on a downlink to combine LTE in a licensed frequency band with LTE in an unlicensed frequency band (e.g., the 2.4 and/or 5 GHz bands already populated by wireless local area network (WLAN) or "Wi-Fi" devices). In other examples, Enhanced LAA (eLAA) and Further Enhanced LAA (feLAA) technologies enable both uplink and downlink LTE operation in unlicensed spectrum, MulteFire is an LTE-based technology that operates in unlicensed and shared spectrum in a standalone mode, NR-U enables NR operation in unlicensed spectrum, and/or the like. In general, when operating a cellular RAT in unlicensed spectrum (e.g., using LAA, eLAA, feLAA, MulteFire, NR-U, and/or the like), one challenge that arises is the need to ensure fair coexistence with incumbent (e.g., WLAN) systems that may be operating in the unlicensed spectrum.

For example, prior to gaining access to and/or transmitting over an unlicensed channel, a transmitting device (e.g., base station 110, UE 120, and/or the like) may need to perform a listen-before-talk (LBT) procedure to contend for access to the unlicensed channel. The LBT procedure may include a clear channel assessment (CCA) procedure to determine whether the unlicensed channel is available (e.g., unoccupied by other transmitters). In particular, a device performing a CCA procedure may detect an energy level on an unlicensed channel and determine whether the energy level satisfies (e.g., is less than or equal to) a threshold, sometimes referred to as an energy detection threshold and/or the like. When the energy level satisfies (e.g., is below) the threshold, the LBT procedure is deemed to be successful and the transmitting device may gain access to the unlicensed channel for a duration that may be referred to as a channel occupancy time (COT). During the COT, the transmitting device can perform one or more transmissions without having to perform any additional LBT operations. However, when the energy level fails to satisfy (e.g., equals or exceeds) the energy detection threshold, the LBT procedure fails and contention to access the unlicensed channel by the transmitting device is deemed unsuccessful.

In cases where the LBT procedure fails due to the CCA procedure resulting in a determination that the unlicensed channel band is unavailable (e.g., because the energy level detected on the unlicensed channel indicates that another device is already using the channel), the CCA procedure may be performed again at a later time. In environments in which the transmitting device may be starved of access to an unlicensed channel (e.g., due to WLAN activity or transmissions by other devices), an extended CCA (eCCA) procedure may be employed to increase the likelihood that the transmitting device will successfully obtain access to the unlicensed channel. For example, a transmitting device performing an eCCA procedure may perform a random quantity of CCA procedures (from 1 to q), in accordance with an eCCA counter. If and/or when the transmitting device senses that the channel has become clear, the transmitting device may start a random wait period based on the eCCA counter and start to transmit if the channel remains clear over the random wait period.

In a wireless network that supports communication in unlicensed spectrum, an LBT procedure may be performed in either a load based equipment (LBE) mode or a frame based equipment (FBE) mode. In the LBE mode, a transmitting device may perform channel sensing in association with an LBT procedure at any time, and a random backoff is used in cases where the unlicensed channel is found to be busy. In the FBE mode, a base station may perform channel sensing in associated with an LBT procedure at fixed time instances, and the base station waits until a fixed time period has elapsed before sensing the unlicensed channel again in cases where the unlicensed channel is found to be busy. In particular, the fixed time instances when the base station performs channel sensing may be defined according to a fixed frame period (FFP).

For example, FIG. 3A depicts an example FFP that a base station may use to communicate in unlicensed spectrum. As shown in FIG. 3A, the FFP may include a channel occupancy time (COT) during which the base station may transmit one or more downlink communications. In some cases, as described below with reference to FIG. 3B, the base station may share the COT with a UE to enable the UE to transmit one or more uplink communications during the COT. As shown in FIG. 3A, the FFP may further include an idle period (sometimes referred to as a gap period and/or the like) at an end of the FFP, after the COT. In particular, the FFP includes the idle period or gap period to provide time for performing an LBT procedure for a next FFP. The FFP, including the COT and the idle period, may have a 1 millisecond (ms) duration, a 2 ms duration, a 2.5 ms duration, a 4 ms duration, a 5 ms duration, a 10 ms duration, and/or the like. Within every two radio frames (e.g., even radio frames), starting positions of the FFPs may be given by i*P, where i={0,1, . . . , 20/P−1} and P is the FFP duration in ms. For a given subcarrier spacing (SCS), the idle period may be a ceiling value for a minimum idle period allowed by regulations, divided by Ts, where the minimum idle period allowed is the maximum of 100 microseconds (μs) and 5% of the FFP duration, and Ts is the symbol duration for the given SCS. Accordingly, the idle period may generally occupy no less than 5% of the FFP duration, and the COT may occupy no more than 95% of the FFP duration.

An FFP configuration for the FBE mode may be included in a system information block (e.g., SIB-1) or signaled to a UE in UE-specific radio resource control (RRC) signaling. If the network indicates FBE operation for fallback downlink and uplink grants, for an indication of LBT Category 2 (25 μs), or LBT without random backoff, or Category 4, or LBT with random backoff and a variable size contention window, the UE may follow a mechanism whereby one 9 μs slot (e.g., one shot LBT) is measured within a 25 μs interval. UE transmissions within the FFP may occur if one or more downlink signals or downlink channels (e.g., a physical downlink control channel (PDCCH), a synchronization signal block (SSB), a physical broadcast channel (PBCH), remaining minimum system information (RMSI), a group common PDCCH (GC-PDCCH), and/or the like) are detected within the FFP. The same 2-bit field may be used in LBE mode and FBE mode to indicate an LBT type, a cyclic prefix extension, a channel access priority class indication, and/or the like.

In Release 16 NR unlicensed (NR-U) FBE mode, only a base station can act as an initiating device, and a UE may only act as a responding device. In NR-U FBE mode, channel access rules may thus be as follows. If the base station is to initiate a COT, a Category 1 (Cat-1) LBT procedure may not apply and the base station may perform a Category 2 (Cat-2) LBT procedure in the idle period just prior to an FFP. If the base station is to transmit a downlink burst in the COT initiated by the base station, the base station may perform a Cat-1 LBT procedure if a gap from a previous downlink or uplink burst is within 16 µs, and otherwise performs a Cat-2 LBT procedure if the gap is more than 16 µs. If the UE is to transmit an uplink burst in the COT initiated by the base station, the UE may perform a Cat-1 LBT procedure if the gap from the previous downlink or uplink burst is within 16 µs, and otherwise performs the Cat-2 LBT procedure if the gap is greater than 16 µs. Notably, the Cat-2 LBT procedure for FBE mode may be different from the Cat-2 LBT procedure (25 µs or 16 µs) in LBE mode. In some aspects, one 9 µs measurement right before the transmission may be needed, with at least 4 µs for measurement. This may be referred to as a one-shot LBT. However, neither the Cat-1 LBT procedure nor the Cat-2 LBT procedure applies in cases where the UE is to initiate a COT in FBE mode, because a UE cannot initiate a COT in Release 16 NR-U FBE mode.

Accordingly, although a wireless network can be configured to use unlicensed spectrum to achieve faster data rates, provide a more responsive user experience, offload traffic from a licensed spectrum, and/or the like, one limitation in FBE mode is that a UE cannot initiate a COT to perform uplink transmissions. In some cases, in order to improve access, efficiency, and/or the like for an unlicensed channel, a wireless network may permit a base station to share a COT with a UE. For example, as shown in FIG. 3B, and by reference number 310, a base station may transmit a COT indicator to one or more UEs (e.g., using group common downlink control information (DCI)) in cases where the base station successfully contends for access to an unlicensed channel (e.g., by performing an LBT procedure that passes), and the COT indicator from the base station may indicate that the one or more UEs do not need to start an FFP. Instead, the one or more UEs can share the COT acquired by the base station and transmit one or more uplink communications during the shared COT.

In a fully controlled environment, permitting only the base station to contend for access to the unlicensed channel and share a COT initiated by the base station with one or more UEs may be sufficient. For example, as described herein, a "fully controlled" environment may be an environment that is restricted or otherwise controlled such that there will be no other RAT or operators operating in the coverage area. Consequently, in a fully controlled environment, an LBT procedure may always pass, even in FBE mode. In practice, however, a fully controlled environment may be difficult to achieve because there may be a chance that some other RAT is operating even in cases where the environment is cleared. For example, an employee in an otherwise cleared factory environment may be carrying a WLAN station that transmits a WLAN access probe even though there are no WLAN access points deployed in the factory environment. Accordingly, in an almost fully controlled environment, there is a small chance that an LBT procedure performed by a base station will fail, which may result in unacceptable performance for services having stringent quality of service requirements (e.g., ultra-reliable low-latency communication (URLLC), industrial internet of things (IIoT) applications, and/or the like). For example, even in cases where an LBT failure rate is as low as $10^{-3}$, there is a $10^{-3}$ probability that a URLLC packet scheduled to be delivered in an FFP cannot be delivered because both the base station and any UE(s) in communication with the base station have to surrender the entire FFP when an LBT procedure performed by the base station at the beginning of the FFP fails. The $10^{-3}$ failure probability may be insufficient to satisfy a URLLC reliability requirement, which typically requires a reliability of $10'$ or better. Furthermore, these problems are exacerbated in uncontrolled environments where there may be many incumbent and/or competing devices contending for access to the unlicensed channel.

Accordingly, in cases where an LBT procedure is to be performed in the FBE mode prior to transmitting on an unlicensed channel, a UE may be unable to transmit uplink data in cases where the base station fails the LBT procedure and/or in cases where the base station does not perform the LBT procedure because the base station does not have a need to transmit downlink data. Consequently, a UE may be permitted to act as an initiating device to perform an LBT procedure in the FBE mode in cases where the base station fails the LBT procedure or otherwise does not transmit a COT indicator to share a COT acquired by the base station (e.g., because the base station did not perform the LBT procedure due to a lack of downlink activity). For example, as further shown in FIG. 3B, and by reference number 320, the UE may perform an LBT procedure to start an FFP and initiate a COT in which to transmit one or more uplink communications in cases where the UE does not detect a COT indicator from the base station. Accordingly, as further shown by reference number 322, the UE may transmit one or more uplink communications over the unlicensed channel if the LBT procedure passes, and detecting the uplink transmission from the UE may indicate that the base station can share the COT acquired by the UE to perform downlink transmissions. While this approach enables the UE to initiate a COT for an unlicensed channel in some circumstances (e.g., when the base station unsuccessfully contends for access to the unlicensed channel due to a failed LBT procedure), a UE is still restricted to not initiate a COT in FBE mode unless the UE fails to detect a COT indicator from the base station.

Some aspects described herein relate to techniques and apparatuses to enable a UE to initiate an LBT procedure in FBE mode in order to start an FFP and acquire a COT in which to transmit on an unlicensed channel regardless of whether a base station attempts, passes, or fails an LBT procedure. In particular, as described herein, a UE may determine a contention slot in which to initiate an LBT procedure based at least in part on a start time associated with an FFP that is configured for the UE in FBE mode, and the UE may initiate the LBT procedure in the contention slot to acquire a COT in an unlicensed channel. For example, in some aspects, COT acquisition may be configured as a property of one or more uplink transmissions that are configured for the UE irrespective of the result of any LBT procedure that is performed (or not performed) by a base station. Additionally, or alternatively, the UE may be enabled to initiate an LBT procedure to acquire a COT prior to a first uplink transmission that is scheduled within an FFP associated with a base station, or a configurable offset after a start time of the FFP associated with the base station. Additionally, or alternatively, a UE may be explicitly configured with an FFP and a timing offset (e.g., with respect to the start time of the FFP associated with the base station), and may initiate an LBT procedure to acquire a COT in cases where one or more uplink transmissions are scheduled during the FFP. In this way, enabling the UE to initiate an LBT procedure to acquire a COT in FBE mode regardless of whether a base station attempts, passes, or fails an LBT procedure may improve spectral efficiency by increasing opportunities to access the unlicensed channel, may conserve resources of the UE by avoiding a need to monitor for a COT indicator from the base station, may conserve network resources by avoiding a need for a base station to transmit a group common DCI that includes a COT indicator to share a COT with one or more UEs, and/or the like.

As indicated above, FIGS. 3A-3B are provided as one or more examples. Other examples may differ from what is described with regard to FIGS. 3A-3B.

FIGS. 4A-4D are diagrams illustrating one or more examples 400 associated with a UE initiated COT in FBE mode, in accordance with various aspects of the present disclosure. As shown in FIGS. 4A-4D, example(s) 400 include a UE (e.g., UE 120 and/or the like) in communication with a base station (e.g., base station 110 and/or the like) in a wireless network (e.g., wireless network 100 and/or the like). Furthermore, as described herein, the UE and the base station may communicate on an uplink and a downlink using one or more unlicensed channels in FBE mode.

Figure 4A:
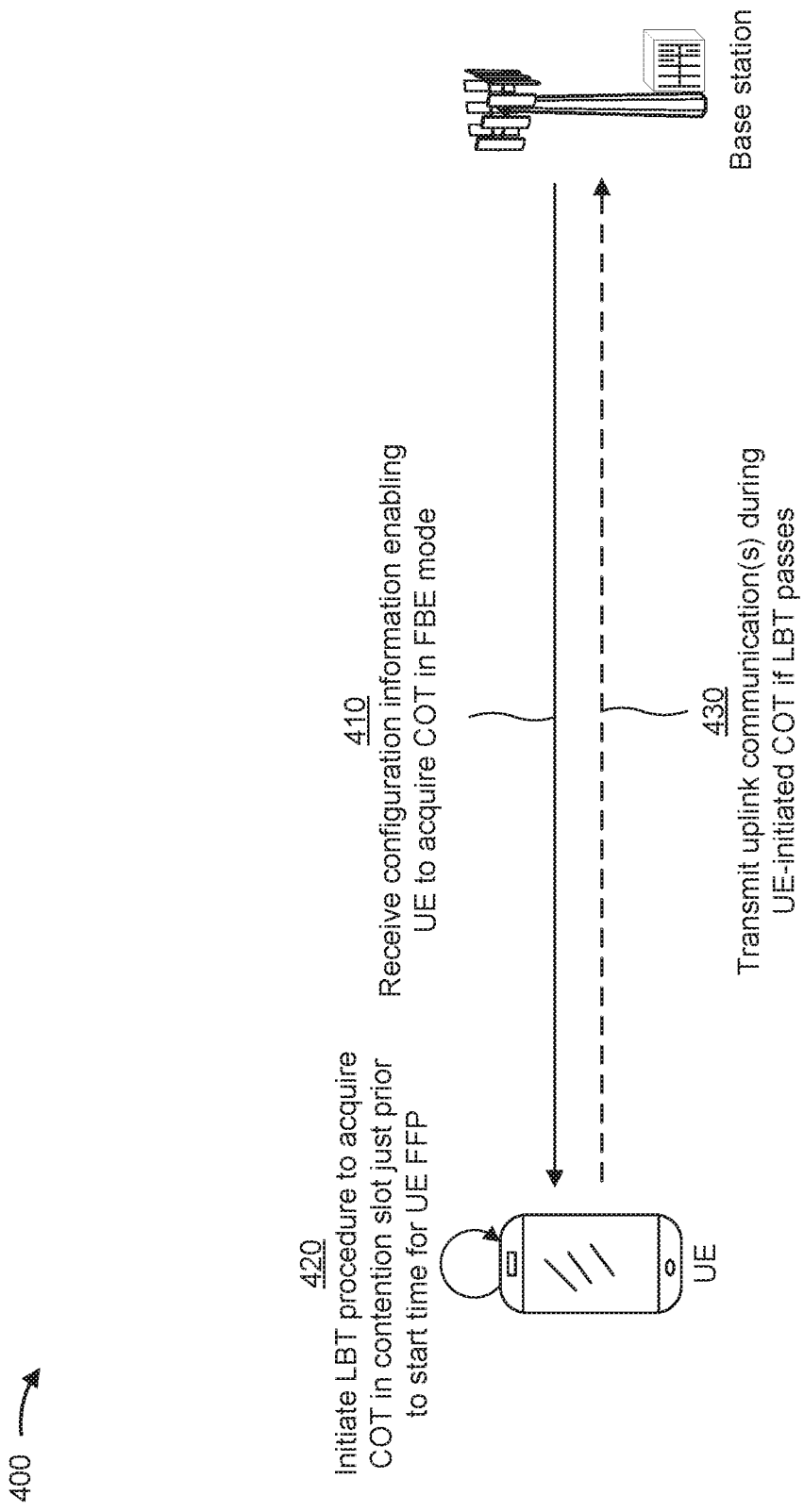
FIGS. 4A-4D are diagrams illustrating one or more examples associated with a UE initiated COT in frame based equipment (FBE) mode, in accordance with various aspects of the present disclosure.

As shown in FIG. 4A, and by reference number 410, the base station may transmit, and the UE may receive, configuration information enabling the UE to acquire a COT in FBE mode. For example, as described in further detail below with reference to FIG. 4B, the base station may transmit RRC configuration information to configure one or more periodic uplink transmissions (e.g., a periodic channel state information (CSI) report, a periodic sounding reference signal (SRS) transmission, a periodic scheduling request (SR), a periodic configured grant physical uplink shared channel (CG-PUSCH), and/or the like), and the one or more periodic uplink transmissions may be associated with an RRC parameter (e.g., 'enableCotAcquisition' and/or the like) that may be enabled, set to a particular value, and/or the like to indicate that the UE can use the periodic uplink transmission(s) to trigger an LBT procedure. Additionally, or alternatively, as described in further detail below with reference to FIG. 4C, the configuration information may indicate that an FFP configured for the UE has an end time that corresponds to an end time of an FFP associated with the base station, and the UE may trigger an LBT procedure prior to a first uplink transmission that is scheduled during the FFP associated with the base station or a configurable offset after the start time of the FFP associated with the base station. Additionally, or alternatively, as described in further detail below with reference to FIG. 4D, the configuration information may indicate a duration for an FFP configured for the UE and a timing offset with respect to the start time of the FFP associated with the base station, and the UE may trigger an LBT procedure prior to a first uplink transmission that is scheduled during the FFP configured for the UE.

Figure 4B:
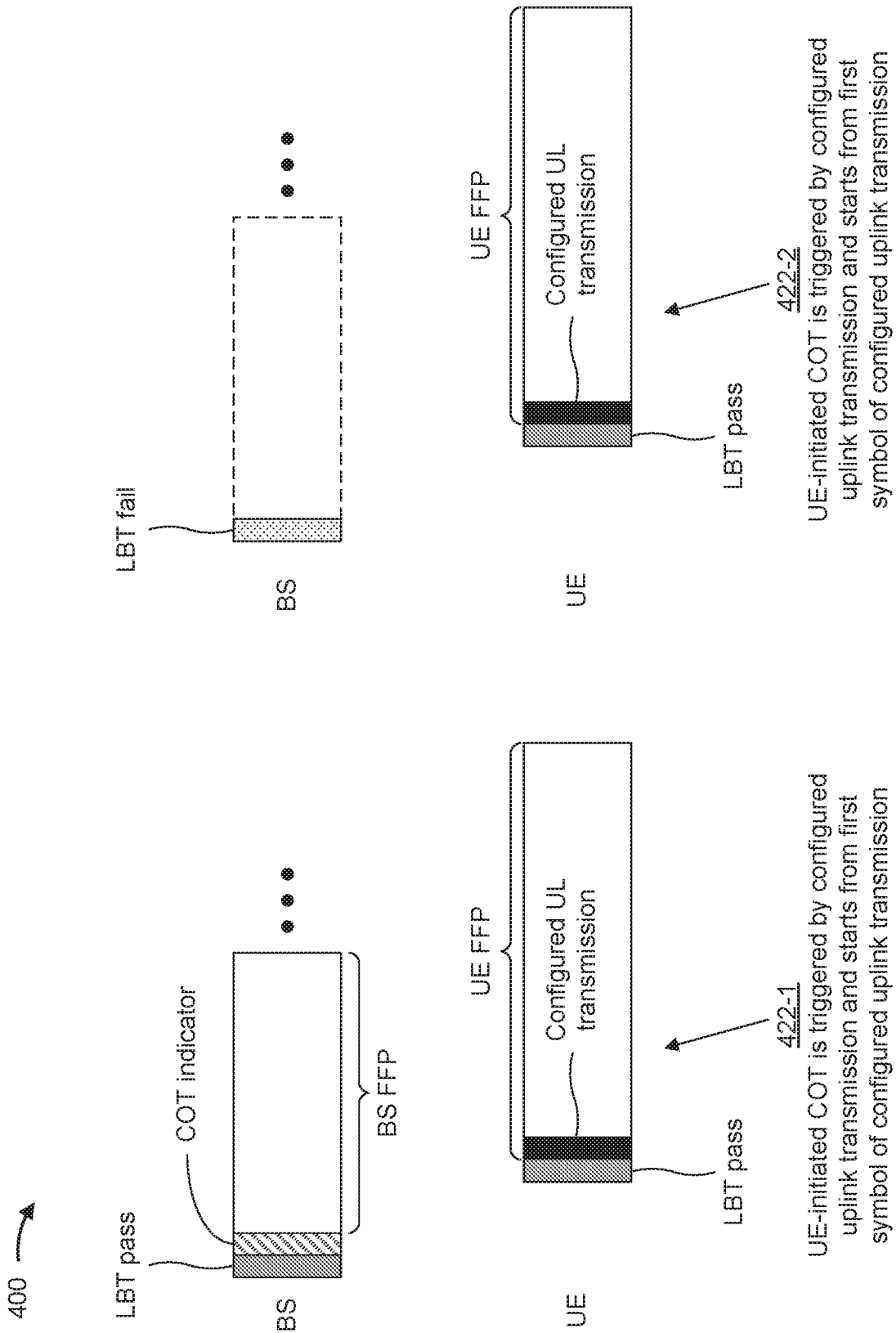

As further shown in FIG. 4A, and by reference number 420, the UE may initiate an LBT procedure to acquire a COT in which to transmit one or more uplink communications in a contention slot that occurs just prior to a start time associated with an FFP that is configured for the UE in FBE mode. For example, in cases where the UE is provided with an RRC uplink configuration scheduling one or more periodic uplink transmissions (e.g., a periodic CSI report, a periodic SRS transmission, a periodic SR, a periodic CG-PUSCH, and/or the like) that are associated with a property (e.g., an RRC parameter) enabling the UE to trigger COT acquisition, the UE may perform the LBT procedure in a contention slot (e.g., a 9 µs time period) that occurs just prior to a first symbol of the periodic uplink transmission, irrespective of whether the UE is sharing a COT acquired by the base station. For example, as shown in FIG. 4B, and by reference number 422-1, the UE may initiate the LBT procedure in a contention slot just prior to a periodic uplink transmission that is configured for the UE, and a COT acquired by the UE may start from the first symbol of the periodic uplink transmission even in cases where the base station transmits a COT indicator to share a COT acquired by the base station. Additionally, or alternatively, as further shown in FIG. 4B, and by reference number 422-2, the UE may similarly initiate the LBT procedure in the contention slot that occurs just prior to the periodic uplink transmission in cases where the base station does not transmit a COT indicator because an LBT procedure performed by the base station failed. In this case, a start time and a duration of the FFP (and therefore a start time and duration of the COT acquired by the UE) may be based at least in part on a periodicity of the uplink transmission. For example, the start time of the FFP may be aligned with the first symbol of the periodic uplink transmission, and the periodicity of the uplink transmission may be used as the duration of the FFP. Additionally, or alternatively, the duration of the FFP may be selected such that the periodicity of the uplink transmission is a multiple of the FFP duration because regulations controlling access to unlicensed channels allow an FFP to have up to a 10 ms duration, and an RRC-configured uplink transmission can have a periodicity of larger than 10 ms. In this case, the UE may use a subset of the configured FFPs to perform uplink transmissions (e.g., every other FFP where the triggering uplink transmission has a 20 ms periodicity and the FFP has a 10 ms duration). Furthermore, in cases where the base station configures the UE with multiple periodic uplink transmissions that are associated with the COT acquisition property, the UE may select one of the periodic uplink transmissions to be the triggering uplink transmission for a certain time period (e.g., to comply with regulations that require an FFP to be maintained for at least 200 ms).

Figure 4C:
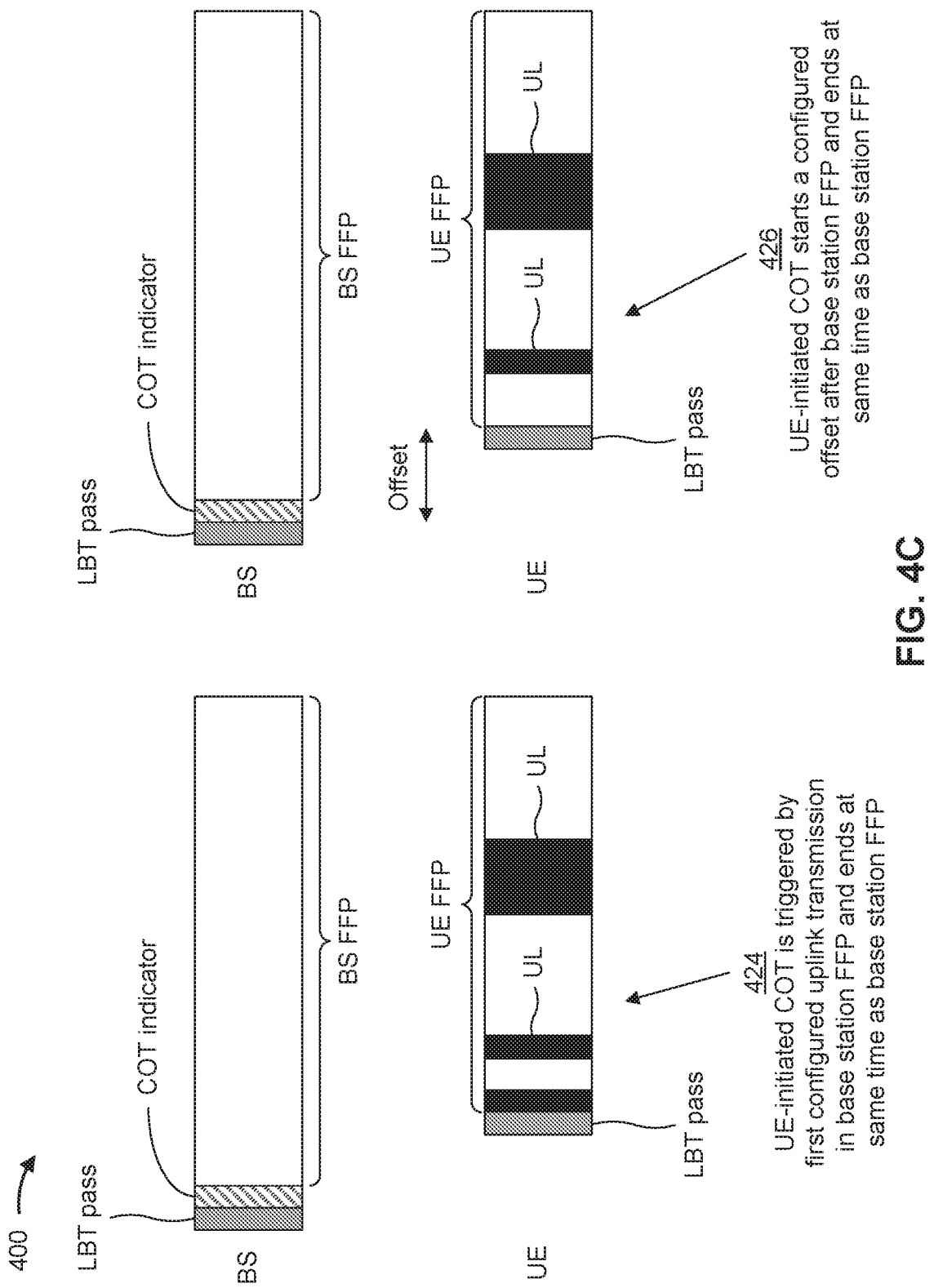

Additionally, or alternatively, as shown in FIG. 4C, and by reference number 424, the base station may configure multiple uplink transmissions for the UE, and the UE may initiate the LBT procedure to acquire a COT in a contention slot just prior to a first one of the multiple uplink transmissions that occur during an FFP associated with the base station. For example, as shown in FIG. 4C, the UE is configured with three uplink transmissions that occur during the FFP associated with the base station, and the UE initiates the LBT procedure in a contention slot that occurs just prior to a first of the three uplink transmissions. In this case, the base station may maintain at least the first uplink transmission at a fixed location in each FFP associated with the base station in order to maintain a timing structure that indicates when the UE is to initiate the LBT procedure to acquire a COT. Furthermore, the UE may transmit the other uplink communications (e.g., the second and/or subsequent uplink communications) that are not used to trigger COT acquisition either during the COT acquired by the UE (if the LBT procedure succeeds) or during a COT shared by the base station (if the base station passes the LBT procedure and provides a COT indicator to share the COT acquired by the base station). As further shown in FIG. 4C, the FFP configured for the UE may generally end at the same time as the FFP associated with the base station, unless there are no uplink transmissions scheduled during the FFP associated with the base station (in which case the UE may skip the FFP).

Additionally, or alternatively, as shown by reference number 426, the FFP configured for the UE may start a configured time offset after the FFP associated with the base station, and end at the same time as the FFP associated with the base station. In this case, the UE may initiate the LBT procedure to acquire a COT in a contention slot just prior to the start time of the FFP configured for the UE, which may or may not be aligned with a scheduled uplink transmission. For example, in some aspects, an ending time of the time offset may correspond to a starting time of a first uplink transmission in cases where the start time of the FFP configured for the UE is aligned with a scheduled uplink transmission, or the time offset may generally have an ending time that is aligned with or prior to a starting time of a first uplink transmission scheduled for the UE. Accordingly, in some aspects, the UE may initiate the LBT procedure to acquire a COT at a time in cases where one or more uplink transmissions are scheduled during the FFP associated with the base station at the configured time offset. Otherwise, when no uplink transmissions are scheduled during the FFP associated with the base station at the configured time offset, the UE may skip the FFP.

Figure 4D:
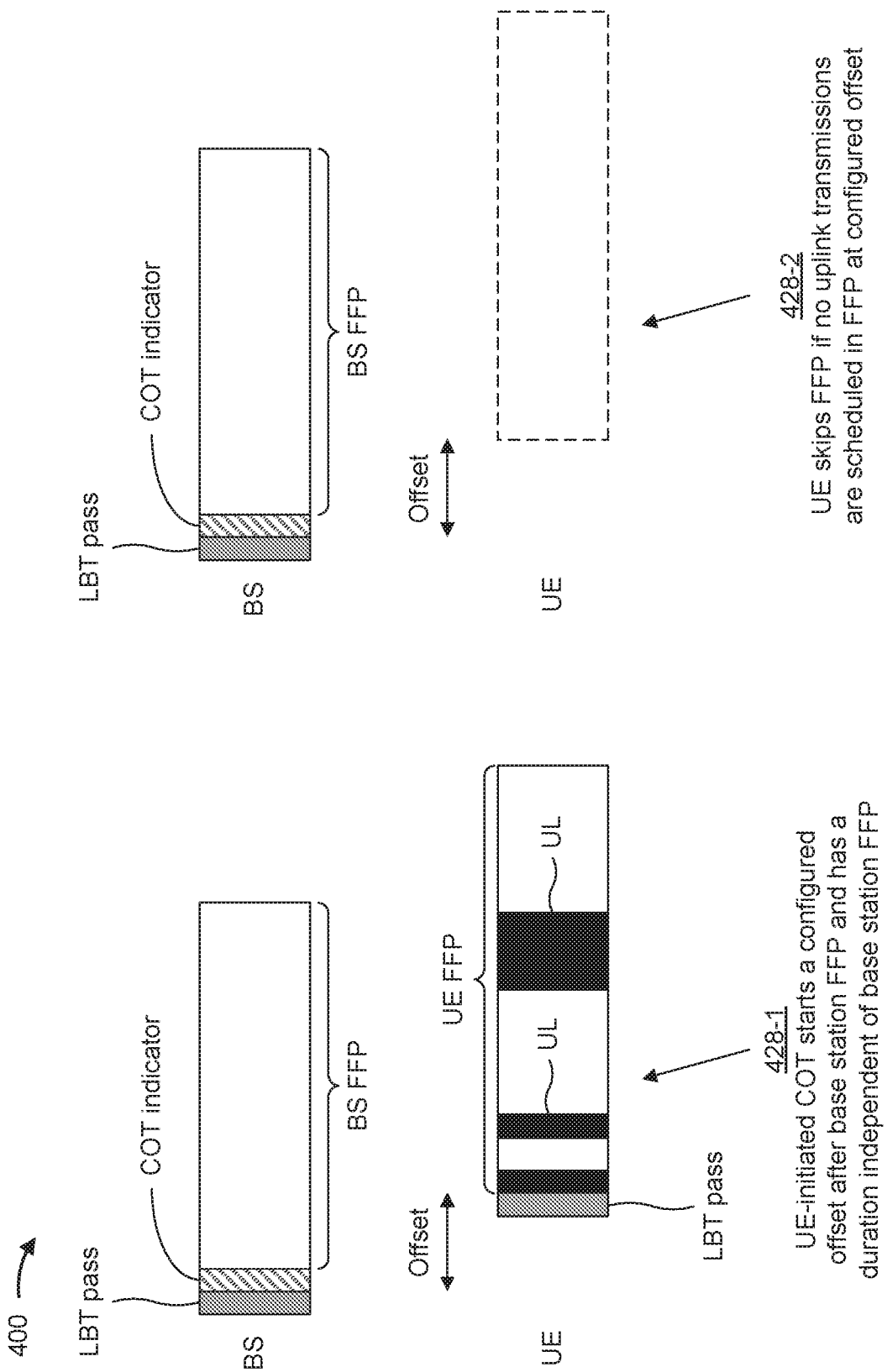

Additionally, or alternatively, as shown in FIG. 4D, the base station may explicitly configure the UE with one or more FFP parameters, which may include a timing offset with respect to the start time of the FFP associated with the base station, a duration for the FFP, a duration for the idle period or gap period at the end of the FFP that is used to perform an LBT procedure prior to a next FFP, and/or the like. Accordingly, in this case, the UE may initiate the LBT procedure in a contention slot that occurs just prior to the start time of the FFP configured for the UE, which is generally based on the timing offset with respect to the start time of the FFP associated with the base station. In this way, the FFP configured for the UE may have a duration and/or an end time that is independent from the FFP associated with the base station, which may allow the UE to perform uplink transmissions during a longer COT before having to perform another LBT procedure. For example, as shown by reference number 428-1, the UE may initiate an LBT procedure to acquire a COT in an FFP that starts a configured offset after the FFP of the base station, and the FFP started by the UE has a duration (and/or end time) that is independent from the FFP of the base station. In general, the UE may initiate the LBT procedure to acquire the COT in cases where the UE has one or more uplink transmissions scheduled during the FFP that starts at the configured offset. Otherwise, as shown by reference number 428-2, the UE may skip an FFP in cases where no uplink transmissions are scheduled in the FFP that starts at the configured offset.

Accordingly, referring again to FIG. 4A, as shown by reference number 430, the UE may transmit one or more uplink communications during the UE-initiated COT if the LBT procedure performed by the UE passes. For example, as described above, the UE may generally initiate the LBT procedure in a contention slot that occurs just prior to an FFP configured for the UE in cases where one or more periodic uplink transmissions are scheduled during the FFP (otherwise, the UE may skip that FFP). Furthermore, as described above, the FFP configured for the UE may start at the first symbol of an uplink transmission (e.g., an earliest uplink transmission), or a configured time offset after the FFP associated with the base station, and the FFP configured for the UE may end at the same time as the FFP associated with the base station or at a time that is independent from the FFP associated with the base station. For example, in some aspects, the duration (and therefore the end time) of the FFP configured for the UE may be based at least in part on a periodicity of an uplink transmission that is aligned with the start time of the FFP, or the duration of the FFP may be explicitly signaled by the base station. Accordingly, in some aspects, the UE may initiate the LBT procedure in a contention slot that occurs in an idle period or a gap period prior to an FFP in which the UE is scheduled to transmit one or more uplink communications, and the FFP may include a COT in which the UE is permitted to transmit one or more uplink communications based at least in part on the LBT procedure succeeding. Furthermore, the FFP may include an idle period or a gap period at the end (following the COT), in which the UE may be required to perform another LBT procedure prior to transmitting one or more uplink communications in a next FFP (e.g., if one or more uplink communications are scheduled in the next FFP). Alternatively, in cases where the LBT procedure performed prior to a particular FFP fails (e.g., because the energy detected on the unlicensed channel fails to satisfy an energy detection threshold), the UE may refrain from transmitting any uplink communications on the unlicensed channel during the particular FFP, and may attempt another LBT procedure in the idle period or gap period prior to the next FFP.

As indicated above, FIGS. 4A-4D is provided as one or more examples. Other examples may differ from what is described with regard to FIGS. 4A-4D.

FIG. 5 is a diagram illustrating an example process 500 performed, for example, by a UE, in accordance with various aspects of the present disclosure. Example process 500 is an example where the UE (e.g., UE 120 and/or the like) performs operations associated with a UE initiated COT in FBE mode.

As shown in FIG. 5, in some aspects, process 500 may include determining a contention slot in which to initiate an LBT procedure based at least in part on a start time associated with an FFP configured for the UE in an FBE mode (block 510). For example, the UE may determine (e.g., using controller/processor 280, memory 282, and/or the like) a contention slot in which to initiate an LBT procedure based at least in part on a start time associated with an FFP configured for the UE in an FBE mode, as described above.

As further shown in FIG. 5, in some aspects, process 500 may include initiating the LBT procedure in the contention slot, wherein the LBT procedure is initiated to acquire a COT in an unlicensed channel (block 520). For example, the UE may initiate (e.g., using antenna 252, DEMOD 254, MIMO detector 256, receive processor 258, controller/processor 280, memory 282, and/or the like) the LBT procedure in the contention slot, as described above. In some aspects, the LBT procedure is initiated to acquire a COT in an unlicensed channel.

Process 500 may include additional aspects, such as any single aspect or any combination of aspects described below and/or in connection with one or more other processes described elsewhere herein.

In a first aspect, the start time associated with the FFP is aligned with a first symbol in which an uplink transmission is scheduled for the UE.

In a second aspect, alone or in combination with the first aspect, the uplink transmission includes one or more of a periodic CSI report transmission, a periodic SRS transmission, a periodic SR transmission, or a periodic CG-PUSCH transmission.

In a third aspect, alone or in combination with one or more of the first and second aspects, the FFP has a duration that is based at least in part on a periodicity of the uplink transmission.

In a fourth aspect, alone or in combination with one or more of the first through third aspects, the uplink transmission is associated with an RRC parameter enabling the UE to acquire the COT based at least in part on the first symbol in which the uplink transmission is scheduled.

In a fifth aspect, alone or in combination with one or more of the first through fourth aspects, the uplink transmission corresponds to a first uplink transmission among multiple uplink transmissions that are scheduled during an FFP associated with a base station in communication with the UE.

In a sixth aspect, alone or in combination with one or more of the first through fifth aspects, the start time associated with the FFP configured for the UE is a configured offset after a start time of an FFP associated with a base station in communication with the UE.

In a seventh aspect, alone or in combination with one or more of the first through sixth aspects, the LBT procedure is initiated based at least in part on determining that one or more uplink transmissions are scheduled for the UE during the FFP associated with the base station.

In an eighth aspect, alone or in combination with one or more of the first through seventh aspects, the FFP configured for the UE has an end time that corresponds to an end time of an FFP associated with a base station in communication with the UE.

In a ninth aspect, alone or in combination with one or more of the first through eighth aspects, the FFP configured for the UE has a duration that is configured by a base station in communication with the UE.

In a tenth aspect, alone or in combination with one or more of the first through ninth aspects, the contention slot occurs in an idle period or a gap period prior to the FFP configured for the UE.

In an eleventh aspect, alone or in combination with one or more of the first through tenth aspects, the FFP configured for the UE includes the COT, in which the UE is permitted to transmit one or more uplink communications, and an idle period or a gap period, in which the UE is required to perform another LBT procedure prior to transmitting one or more uplink communications in a next FFP.

In a twelfth aspect, alone or in combination with one or more of the first through eleventh aspects, process 500 includes transmitting one or more uplink communications in the unlicensed channel during the COT, based at least in part on the LBT procedure succeeding.

In a thirteenth aspect, alone or in combination with one or more of the first through twelfth aspects, process 500 includes refraining from transmitting one or more uplink communications in the unlicensed channel during the FFP, based at least in part on the LBT procedure failing.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    determining a contention slot in which to initiate a listen-before-talk (LBT) procedure based at least in part on a start time associated with a fixed frame period (FFP) configured for the UE in a frame based equipment (FBE) mode; and
    initiating the LBT procedure in the contention slot, wherein the LBT procedure is initiated to acquire a channel occupancy time (COT) in an unlicensed channel.

2. The method of claim 1, wherein the start time associated with the FFP is aligned with a first symbol in which an uplink transmission is scheduled for the UE.

3. The method of claim 2, wherein the uplink transmission includes one or more of a periodic channel state information report transmission, a periodic sounding reference signal transmission, a periodic scheduling request transmission, or a periodic configured grant physical uplink shared channel transmission.

4. The method of claim 2, wherein the FFP has a duration that is based at least in part on a periodicity of the uplink transmission.

5. The method of claim 2, wherein the uplink transmission is associated with a radio resource control parameter enabling the UE to acquire the COT based at least in part on the first symbol in which the uplink transmission is scheduled.

6. The method of claim 2, wherein the uplink transmission corresponds to a first uplink transmission among multiple uplink transmissions that are scheduled during an FFP associated with a base station in communication with the UE.

7. The method of claim 1, wherein the start time associated with the FFP configured for the UE is a configured offset after a start time of an FFP associated with a base station in communication with the UE.

8. The method of claim 7, wherein the LBT procedure is initiated based at least in part on determining that one or more uplink transmissions are scheduled for the UE during the FFP associated with the base station.

9. The method of claim 1, wherein the FFP configured for the UE has an end time that corresponds to an end time of an FFP associated with a base station in communication with the UE.

10. The method of claim 1, wherein the FFP configured for the UE has a duration that is configured by a base station in communication with the UE.

11. The method of claim 1, wherein the contention slot occurs in an idle period or a gap period prior to the FFP configured for the UE.

12. The method of claim 1, wherein the FFP configured for the UE includes the COT, in which the UE is permitted to transmit one or more uplink communications, and an idle period or a gap period, in which the UE is required to perform another LBT procedure prior to transmitting one or more uplink communications in a next FFP.

13. The method of claim 1, further comprising:
transmitting one or more uplink communications in the unlicensed channel during the COT, based at least in part on the LBT procedure succeeding.

14. The method of claim 1, further comprising:
refraining from transmitting one or more uplink communications in the unlicensed channel during the FFP, based at least in part on the LBT procedure failing.

15. A user equipment (UE) for wireless communication, comprising:
one or more memories; and
one or more processors operatively coupled to the one or more memories, the one or more memories and the one or more processors configured to:
determine a contention slot in which to initiate a listen-before-talk (LBT) procedure based at least in part on a start time associated with a fixed frame period (FFP) configured for the UE in a frame based equipment (FBE) mode; and
initiate the LBT procedure in the contention slot, wherein the LBT procedure is initiated to acquire a channel occupancy time (COT) in an unlicensed channel.

16. The UE of claim 15, wherein the start time associated with the FFP is aligned with a first symbol in which an uplink transmission is scheduled for the UE.

17. The UE of claim 16, wherein the uplink transmission includes one or more of a periodic channel state information report transmission, a periodic sounding reference signal transmission, a periodic scheduling request transmission, or a periodic configured grant physical uplink shared channel transmission.

18. The UE of claim 16, wherein the FFP has a duration that is based at least in part on a periodicity of the uplink transmission.

19. The UE of claim 16, wherein the uplink transmission is associated with a radio resource control parameter enabling the UE to acquire the COT based at least in part on the first symbol in which the uplink transmission is scheduled.

20. The UE of claim 16, wherein the uplink transmission corresponds to a first uplink transmission among multiple uplink transmissions that are scheduled during an FFP associated with a base station in communication with the UE.

21. The UE of claim 15, wherein the start time associated with the FFP configured for the UE is a configured offset after a start time of an FFP associated with a base station in communication with the UE.

22. The UE of claim 21, wherein the LBT procedure is initiated based at least in part on determining that one or more uplink transmissions are scheduled for the UE during the FFP associated with the base station.

23. The UE of claim 15, wherein the FFP configured for the UE has an end time that corresponds to an end time of an FFP associated with a base station in communication with the UE.

24. The UE of claim 15, wherein the FFP configured for the UE has a duration that is configured by a base station in communication with the UE.

25. The UE of claim 15, wherein the contention slot occurs in an idle period or a gap period prior to the FFP configured for the UE.

26. The UE of claim 15, wherein the FFP configured for the UE includes the COT, in which the UE is permitted to transmit one or more uplink communications, and an idle period or a gap period, in which the UE is required to perform another LBT procedure prior to transmitting one or more uplink communications in a next FFP.

27. The UE of claim 15, wherein the one or more processors are further configured to:
transmit one or more uplink communications in the unlicensed channel during the COT, based at least in part on the LBT procedure succeeding.

28. The UE of claim 15, wherein the one or more processors are further configured to:
refrain from transmitting one or more uplink communications in the unlicensed channel during the FFP, based at least in part on the LBT procedure failing.

29. A non-transitory computer-readable medium storing a set of instructions for wireless communication, the set of instructions comprising:
one or more instructions that, when executed by one or more processors of a user equipment (UE), cause the UE to:
determine a contention slot in which to initiate a listen-before-talk (LBT) procedure based at least in part on a start time associated with a fixed frame period configured for the UE in a frame based equipment (FBE) mode; and
initiate the LBT procedure in the contention slot, wherein the LBT procedure is initiated to acquire a channel occupancy time in an unlicensed channel.

30. An apparatus for wireless communication, comprising:
- means for determining a contention slot in which to initiate a listen-before-talk (LBT) procedure based at least in part on a start time associated with a fixed frame period configured for the apparatus in a frame based equipment (FBE) mode; and
- means for initiating the LBT procedure in the contention slot, wherein the LBT procedure is initiated to acquire a channel occupancy time in an unlicensed channel.

* * * * *